US012749127B2

(12) United States Patent
Robare

(10) Patent No.: US 12,749,127 B2
(45) Date of Patent: *Sep. 29, 2026

(54) DRIVER IDENTITY DETECTION AND ALERTS

(71) Applicant: ALLSTATE INSURANCE COMPANY, Northbrook, IL (US)

(72) Inventor: Philip Robare, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/224,234

(22) Filed: May 30, 2025

(65) Prior Publication Data

US 2025/0292335 A1 Sep. 18, 2025

Related U.S. Application Data

(63) Continuation of application No. 18/377,476, filed on Oct. 6, 2023, now Pat. No. 12,346,973, which is a continuation of application No. 17/323,531, filed on May 18, 2021, now Pat. No. 11,816,737, which is a continuation of application No. 15/230,961, filed on Aug. 8, 2016, now Pat. No. 11,042,938.

(51) Int. Cl.

| | |
|---|---|
| ***G06Q 40/08*** | (2012.01) |
| ***G01C 21/34*** | (2006.01) |
| ***H04W 88/02*** | (2009.01) |

(52) U.S. Cl.

CPC ......... *G06Q 40/08* (2013.01); *G01C 21/3484* (2013.01); *H04W 88/02* (2013.01)

(58) Field of Classification Search

None

See application file for complete search history.

(56) References Cited

U.S. PATENT DOCUMENTS

| | | | | |
|---|---|---|---|---|
| 5,325,291 A * | 6/1994 | Garrett | ................... | G06Q 99/00 705/4 |
| 6,225,890 B1 * | 5/2001 | Murphy | ............... | G07C 5/0858 340/5.1 |

(Continued)

OTHER PUBLICATIONS

P. Händel, I. Skog, M. Ohlsson and J. Ohlsson, "Smartphone instrumentation for insurance telematics," 2015 IEEE International Instrumentation and Measurement Technology Conference (I2MTC) Proceedings, Pisa, Italy, 2015, pp. 1613-1616. (Year: 2015).*

(Continued)

*Primary Examiner* — Mohammad Z Shaikh

(57) ABSTRACT

Disclosed herein are systems and/or methods for determining an insurance status for one or more drivers and/or vehicles. The system may identify a driver of a vehicle, such as by facial recognition or a retinal scan. Based on the identification, the system may determine the insurance status of the driver. If there is an issue with the insurance status, the system may prompt the driver to take some action. The system may also institute limitations upon the vehicle if there is an issue with the insurance status. In some instances, the system may determine the insurance status for multiple drivers in the area, and may warn a driver if he or she is in the vicinity of one or more underinsured drivers and/or vehicles.

20 Claims, 5 Drawing Sheets

(56) References Cited

U.S. PATENT DOCUMENTS

| | | | | |
|---|---|---|---|---|
| 6,233,563 | B1 * | 5/2001 | Jefferson | G06Q 40/08 705/4 |
| 6,831,993 | B2 * | 12/2004 | Lemelson | G06V 40/161 340/5.83 |
| 7,023,328 | B2 * | 4/2006 | Yuhara | G07C 9/00182 340/901 |
| 8,290,705 | B2 * | 10/2012 | Trinko | G01C 21/367 701/532 |
| 8,606,512 | B1 * | 12/2013 | Bogovich | H04W 4/40 701/410 |
| 8,712,803 | B1 * | 4/2014 | Buentello | G06Q 40/08 705/35 |
| 9,129,336 | B2 * | 9/2015 | Ehrman | G07C 5/008 |
| 9,442,888 | B2 * | 9/2016 | Stanfield | B60N 2/0027 |
| 9,452,735 | B2 * | 9/2016 | Miller | B60W 50/14 |
| 9,493,149 | B2 * | 11/2016 | Phelan | B60R 16/033 |
| 9,542,735 | B2 * | 1/2017 | Shukla | H04N 5/272 |
| 9,656,606 | B1 * | 5/2017 | Vose | G01S 19/42 |
| 9,694,816 | B2 * | 7/2017 | Morissette | B60W 30/146 |
| 9,715,711 | B1 * | 7/2017 | Konrardy | G06Q 40/08 |
| 9,727,922 | B1 * | 8/2017 | Saenglongma | G06Q 20/322 |
| 9,779,458 | B2 * | 10/2017 | Hayward | G06Q 40/08 |
| 9,783,159 | B1 * | 10/2017 | Potter | G08B 25/00 |
| 9,830,665 | B1 * | 11/2017 | Healy | B60W 40/09 |
| 9,863,392 | B1 * | 1/2018 | Tucker | F02D 41/26 |
| 9,908,508 | B2 * | 3/2018 | Phelan | B60R 25/23 |
| 9,911,159 | B1 * | 3/2018 | Srey | H04W 48/02 |
| 9,928,353 | B2 * | 3/2018 | Brewer | G06F 21/35 |
| 10,832,327 | B1 * | 11/2020 | Potter | G06Q 40/08 |
| 10,853,881 | B1 * | 12/2020 | LaBarre | G06Q 40/08 |
| 10,893,354 | B2 * | 1/2021 | Irii | H04R 1/083 |
| 2003/0182165 | A1 * | 9/2003 | Kato | G06Q 10/025 705/6 |
| 2005/0203780 | A1 * | 9/2005 | Lott | G06Q 10/10 705/4 |
| 2005/0209882 | A1 * | 9/2005 | Jacobsen | G16H 50/20 705/2 |
| 2005/0283388 | A1 * | 12/2005 | Eberwine | G06Q 40/08 707/999.003 |
| 2006/0095305 | A1 * | 5/2006 | Madison | G06Q 40/08 705/4 |
| 2007/0151133 | A1 * | 7/2007 | Hunsaker | G09F 3/02 40/200 |
| 2007/0200663 | A1 * | 8/2007 | White | B60R 25/25 340/5.31 |
| 2008/0027761 | A1 * | 1/2008 | Bracha | G06Q 40/00 705/4 |
| 2008/0106390 | A1 * | 5/2008 | White | B60R 25/04 340/5.2 |
| 2008/0258890 | A1 * | 10/2008 | Follmer | G08G 1/052 340/439 |
| 2009/0024273 | A1 * | 1/2009 | Follmer | G06Q 10/10 701/33.4 |
| 2009/0177336 | A1 * | 7/2009 | McClellan | B60R 25/209 701/2 |
| 2011/0106370 | A1 * | 5/2011 | Duddle | G09B 9/042 701/31.4 |
| 2011/0161118 | A1 * | 6/2011 | Borden | G01C 21/3856 705/4 |
| 2011/0208646 | A1 * | 8/2011 | McMaster | G06Q 20/10 705/39 |
| 2011/0213628 | A1 * | 9/2011 | Peak | G06Q 40/08 705/4 |
| 2012/0173128 | A1 * | 7/2012 | Peeler | G06Q 10/06 701/113 |
| 2013/0138267 | A1 * | 5/2013 | Hignite | G06F 17/00 701/2 |
| 2013/0317655 | A1 * | 11/2013 | Shah | F24D 19/1048 700/286 |
| 2013/0317665 | A1 * | 11/2013 | Fernandes | G08G 5/34 701/1 |
| 2014/0039934 | A1 * | 2/2014 | Rivera | G06Q 10/10 705/4 |
| 2014/0094987 | A1 * | 4/2014 | Healey | B60R 25/00 701/1 |
| 2014/0266789 | A1 * | 9/2014 | Matus | H04Q 9/00 340/870.07 |
| 2015/0039348 | A1 * | 2/2015 | Miller | G07C 5/008 705/4 |
| 2015/0039350 | A1 * | 2/2015 | Martin | G06Q 30/0261 705/4 |
| 2015/0039365 | A1 * | 2/2015 | Haque | B60R 13/10 705/7.13 |
| 2015/0170287 | A1 * | 6/2015 | Tirone | G06Q 40/08 705/4 |
| 2016/0086285 | A1 * | 3/2016 | Jordan Peters | G08G 1/096827 701/484 |
| 2016/0167652 | A1 * | 6/2016 | Slusar | B60W 30/143 701/27 |
| 2016/0189304 | A1 * | 6/2016 | Todasco | G06Q 40/08 705/4 |
| 2016/0239849 | A1 * | 8/2016 | Othmer | G06Q 30/018 |
| 2017/0057353 | A1 * | 3/2017 | Griffin | B60K 28/063 |
| 2017/0297529 | A1 * | 10/2017 | Hamilton | H04L 67/306 |
| 2017/0357980 | A1 * | 12/2017 | Bakun | G06Q 20/027 |
| 2020/0219197 | A1 * | 7/2020 | Fields | G06F 8/65 |

OTHER PUBLICATIONS

Byung Yun Lee, Yong Yoon Shin and Hyun Joo Bae, "Development of insurance server system based on vehicle driving information," 2012 7th International Conference on Computing and Convergence Technology (ICCCT), Seoul, Korea (South), 2012, pp. 156-159. (Year: 2012).*

P. Handel et al., "Insurance Telematics: Opportunities and Challenges with the Smartphone Solution," in IEEE Intelligent Transportation Systems Magazine, vol. 6, No. 4, pp. 57-70, winter 2014. (Year: 2014).*

* cited by examiner

DRIVER IDENTITY DETECTION AND ALERTS

CROSS-REFERENCE TO RELATED APPLICATIONS

This is a continuation of U.S. patent application Ser. No. 18/377,476, filed on Oct. 6, 2023, which is a continuation of U.S. patent application Ser. No. 17/323,531, filed on May 18, 2021, and is issued as U.S. Pat. No. 11,816,737 on Nov. 14, 2023, which is a continuation of U.S. patent application Ser. No. 15/230,961, filed on Aug. 8, 2016, and is issued as U.S. Pat. No. 11,042,938 on Jun. 22, 2021. The contents of all the above-described disclosures are incorporated fully herein by reference in their entirely.

BACKGROUND

Modes of transportation (e.g., train, bus, airplane, etc.) are becoming more and more sophisticated and inter-connected. In some cases, it may be beneficial to create systems for monitoring travelers in order to increase driver safety. As such, new systems, methods, and devices may be desired for optimizing driver performance and safety.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for determining the insurance status for a traveler. For example, an insurance status determination system may determine an insurance status for a traveler based on data collected during any form of travel (e.g., car, train, bus, airplane, etc.), in which a traveler may be a driver of a vehicle, a passenger in a vehicle, or a passenger in any mode of transportation (e.g., a bus, a train, airplane, spacecraft, etc.). In some arrangements, the insurance status determination system may notify the traveler if there is some issue with an insurance policy associated with the traveler. The insurance status determination system may also instigate some form of remedial action, such as prompting the traveler to renew a lapsed policy.

In some instances, the insurance status determination system may determine the insurance statuses of nearby travelers (e.g., nearby drivers). The insurance status determination system may inform the traveler of underinsured nearby travelers, and provide options to take remedial action (such as taking an alternate route or opting into a limited-time insurance policy to cover additional risk).

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
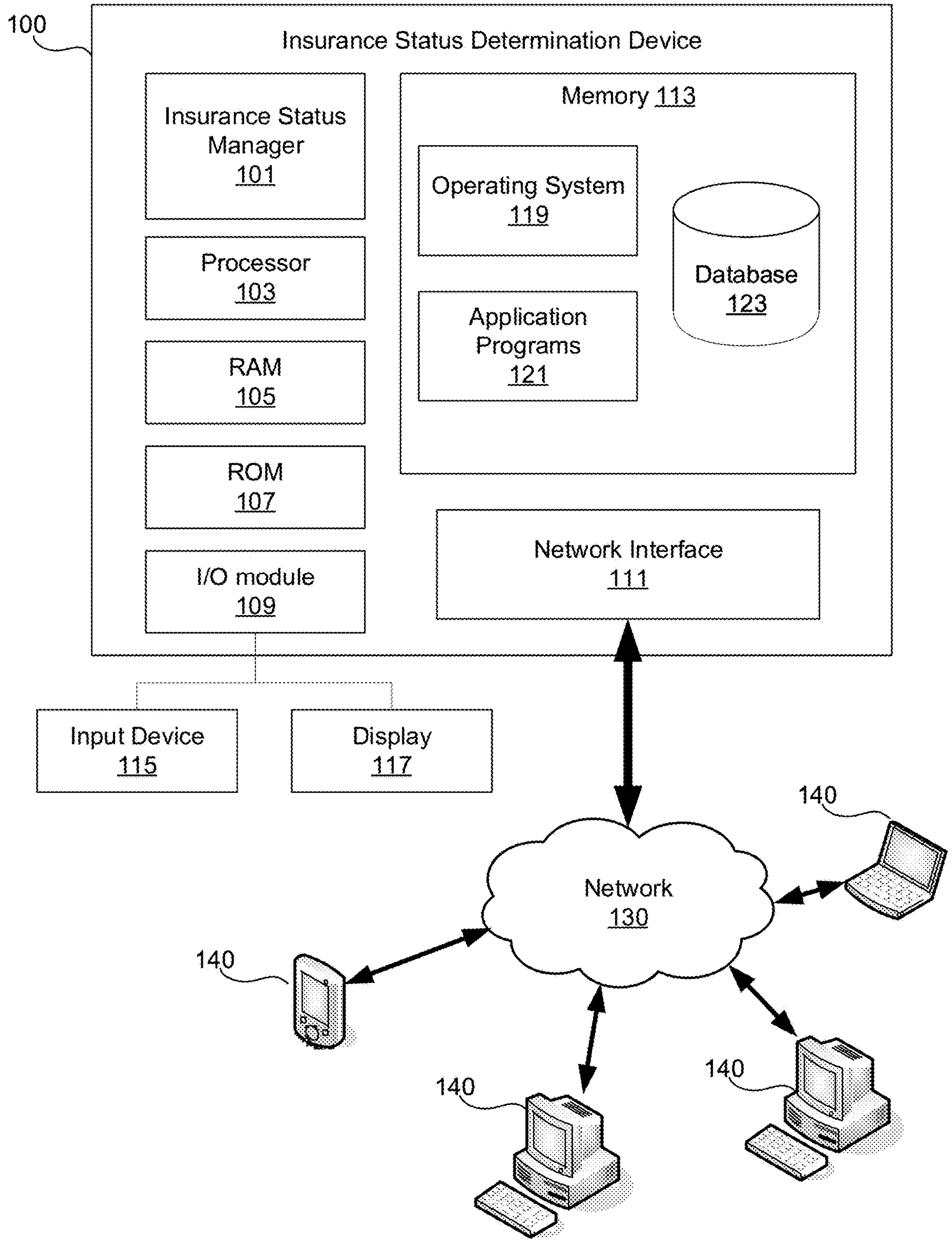
FIG. 1 depicts a block diagram of an example insurance status determination device that may be used in accordance with one or more example embodiments.

In accordance with various aspects of the disclosure, computerized methods, systems, devices, and apparatuses are disclosed that determine an insurance status of one or more travelers, in which the traveler may be a driver of a vehicle, a passenger of a vehicle, a passenger in any other form of transportation (e.g., bus, train, airplane, helicopter, watercraft, spacecraft, etc.) or an individual traveling by a bicycle or by foot (e.g., walking, jogging, or running). An insurance status may indicate whether or not a traveler has insurance coverage, whether the coverage meets governmental guidelines, policy periods, prior accidents, collected traveling data for previous trips, analyzed driving behaviors, claims history, and/or the like. In particular, the present disclosure provides a system that may be beneficial for travelers (e.g., both drivers and passengers) in that the system may notify a traveler of the insurance status of a driver, passenger(s), and/or nearby drivers in other vehicles. For example, the system may notify a driver or passenger that a traveler (the driver, the passenger, another driver in a vehicle operating near the driver or passenger, or the like) is underinsured.

The system may use the insurance status information to take remedial action in order to alleviate potential risks. For example, the system may determine whether a traveler needs to renew an insurance policy when he starts his car, and provide an interface to do so. In another example, the system may warn a traveler of a large number of underinsured motorists in the area, and may provide solutions to reduce the risks to the traveler (such as taking an alternate route that avoids the underinsured travelers or offering a limited-time insurance policy that increases insurance coverage in case of a collision with an underinsured traveler). In some instances, actions may be automatic or in response to preset selection. For example, a policy may be renewed in response to a pre-selection by a driver to automatically renew the policy. In another example, warnings to a driver may be automatic, but future warnings may be suppressed if a driver selects an option. In some instances, actions may require driver input. For example, a vehicle may prompt a driver to take an alternate route to avoid underinsured drivers, but may not change routes unless the driver selects an option to do so on a display.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, flash drives, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, aspects of the present disclosure may be implemented with a computing device. FIG. 1 illustrates a block diagram of an example insurance status determination device 100 that may be used in accordance with aspects of the present disclosure. The insurance status determination device 100 is a specialized computing device programmed and/or configured to perform and carry out aspects associated with providing traveling-based insurance ratings to travelers as described herein. The insurance status determination device 100 may have an insurance status manager 101 configured to perform methods and execute instructions as described herein. The insurance status manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the insurance status manager 101 may refer to the software (e.g., a computer program or application) and/or hardware used to receive identification information (e.g., information identifying a traveler), identify insurance status information associated with the traveler, and provide feedback based on the insurance status information. The one or more specially configured processors of the insurance status manager 101 may operate in addition to or in conjunction with another processor 103 of the insurance status determination device 100. In some embodiments, the insurance status manager 101 may be a software module executed by one or more processors 103. Both the insurance status manager 101 and the processor 103 may be capable of controlling operations of the insurance status determination device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the insurance status determination device 100 may provide input data. The I/O module 109 may also be configured to be connected to a display device 117, such as a monitor, television, touchscreen, and the like, and may include a graphics card. The display device 117 and input device 115 are shown as separate elements from the insurance status determination device 100; however, they may be within the same structure or integrated.

Using the input device 115, system administrators may update various aspects of the system, such as rules, predefined threshold values, predetermined ranges, and/or insurance status information. For example, system administrators may use the input device 115 to update the policy period for an insurance policy.

The memory 113 may be any computer readable medium for storing computer executable instructions (e.g., software). The instructions stored within memory 113 may enable the insurance status determination device 100 to perform various functions. For example, memory 113 may store software used by the insurance status determination device 100, such as an operating system 119 and/or application programs 121, and may include an associated database 123.

The network interface 111 allows the insurance status determination device 100 to connect to and communicate with a network 130. The network 130 may be any type of network, including a local area network (LAN) and/or a wide area network (WAN), such as the Internet. Through the network 130, the insurance status determination device 100 may communicate with one or more computing devices 140, such as laptops, notebooks, smartphones, personal computers, servers, and the like. The computing devices 140 may include at least some of the same components as insurance status determination device 100. In some embodiments the insurance status determination device 100 may be connected to the computing devices 140 to form a "cloud" computing environment.

The network interface 111 may connect to the network 130 via communication lines, such as coaxial cable, fiber optic cable, and/or the like, or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and/or the like, to communicate with other computing devices 140.

FIG. 1 is an example embodiment of an insurance status determination device 100. In other embodiments, the insurance status determination device 100 may include fewer or more elements. For example, the insurance status determination device 100 may use the processor(s) 103 to perform functions of the insurance status manager 101, and thus might not include a separate processor or hardware for the insurance status manager 101. Additionally, or alternatively, the insurance status determination device 100 may be a mobile device (e.g., a smartphone, tablet, and the like) specially configured to perform or carry out aspects of the insurance status determination service described herein, and thus may also include various other components such as a battery, speaker, and/or antennas (not shown). Also, the insurance status determination device 100 may be a telematics device and/or a vehicle computing device (either installed by a vehicle manufacturer or as an aftermarket part) having vehicle compatible elements, such as a port for an on-board diagnostic connector, a display (e.g., an interactive infotainment display, dashboard display, etc.), and/or ports for other vehicle sensors (e.g., fuel level sensors, tire pressure sensors, engine temperature sensors, and the like). For example, the insurance status determination device 100 may be a vehicle's computer or a device plugged into the vehicle's computer.

Figure 2:
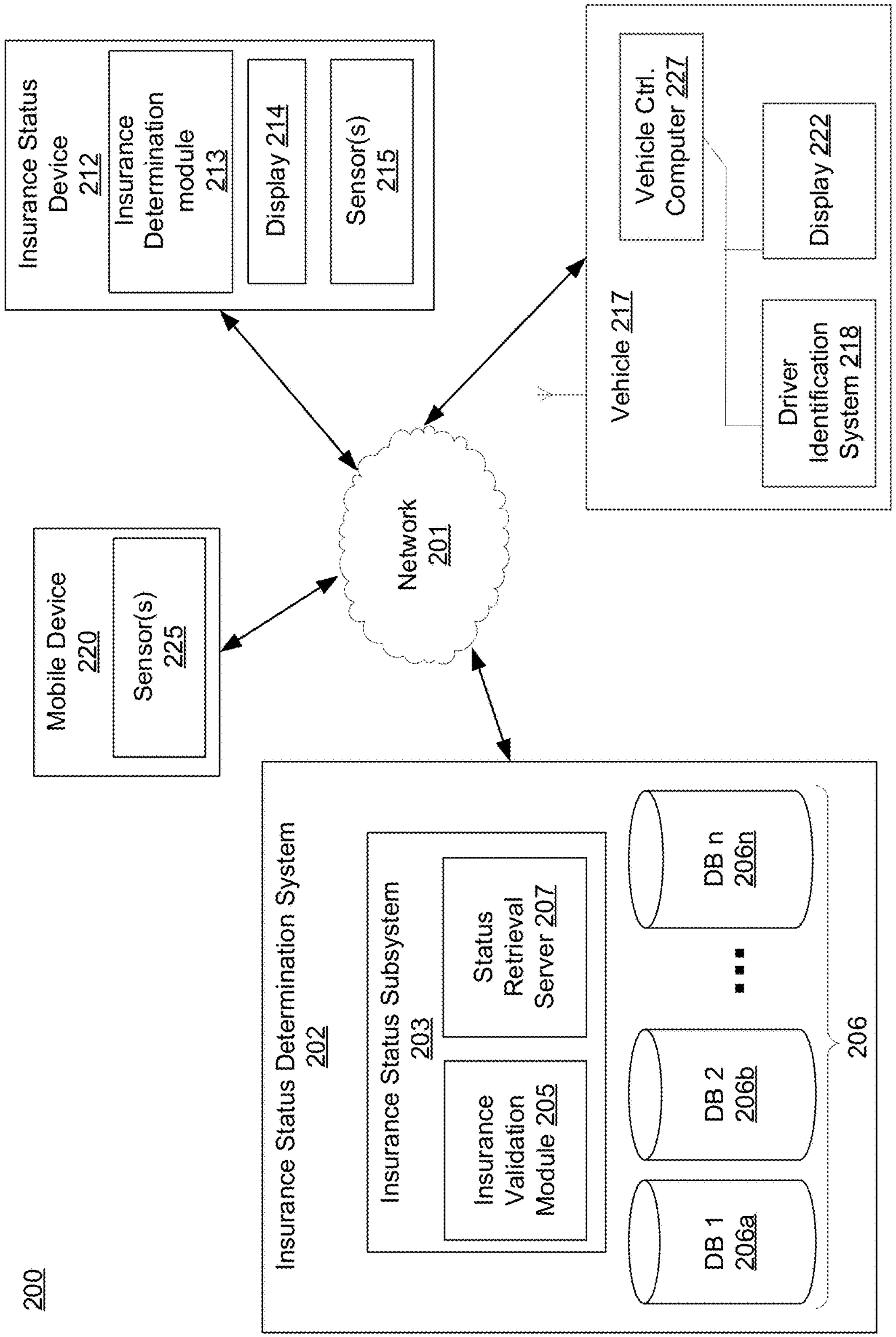
FIG. 2 depicts an example network environment in which various aspects of the present disclosure may be implemented in accordance with one or more example embodiments.

The computerized methods for determining the insurance status of travelers (e.g., passengers and/or drivers) as disclosed herein may be implemented on one or more insurance status determination devices 100 used in various network environments. FIG. 2 illustrates an example network environment 200 for implementing methods in accordance with aspects of the present disclosure.

As shown in FIG. 2, the network environment 200 may include a network 201 configured to connect an insurance status determination system 202, insurance status device 212, vehicle 217, and mobile device 220. The insurance status device 212 may be the same as, or at least similar to, the insurance status determination device 100 described above with reference to FIG. 1. Collectively, these specialized computing devices may form at least a part of an insurance status determination system. Although only one of each of the components 212, 217, and 220 are shown in FIG. 2, it is understood that there may be any number of components 212, 217, and 220 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers.

Accordingly, for example, a mobile device 220 (e.g., a smartphone, flip-phone, tablet, and the like) or an insurance status device 212 of a traveler (e.g., a passenger or a driver associated with vehicle 217 or a passenger in another form of transportation) may communicate via a cellular backhaul of the network 201 with an insurance status determination system 202 to request an insurance status as a part of the insurance status determination service. For example, the mobile device 220 or insurance status device 212 may request for the insurance status determination system 202 to provide up-to-date insurance status information for a driver. In another example, the mobile device 220 or the insurance status device 212 of the traveler (e.g., passenger or driver of the vehicle 217 or a passenger in another form of transportation) may communicate via the cellular backhaul of the network 201 with the insurance status determination system 202 to submit information regarding passenger, driver or vehicle information, or to update account information and/or preferences for the insurance status determination service (e.g., for the vehicle 217).

In some arrangements, the insurance status determination system 202 may communicate via the cellular backhaul of the network 201 with the mobile device 220 or the insurance status device 212 to notify the user (e.g., the passenger of vehicle 217 or the driver of vehicle 217 or a passenger in another form of transportation) of the mobile device 220 or insurance status device 212 of insurance status information. In another embodiment, the mobile device 220 and/or insurance status device 212 may communicate back and forth with the insurance status determination system 202 over the Internet, such as through a web portal. As shown in FIG. 2, it should be understood that the mobile device 220 or insurance status device 212 may connect to the network even if it is removed from the vehicle 217. In some cases, the mobile device 220 or insurance status device 212 may request and/or transmit data even when a user is moving or traveling without the vehicle 217 (e.g., such as in a bus, a train, airplane, spacecraft, bicycle, etc.). Thus, the insurance status determination service described herein may be implemented with or without the vehicle 217.

Although FIG. 2 illustrates only one vehicle 217, the insurance determination system 202 may be configured to communicate with multiple vehicles 217 simultaneously (e.g., at or around the same time), and the multiple vehicles 217 may be associated with multiple individuals. The multiple vehicles 217 may be any type of vehicle, including a car, motorcycle, bicycle, scooter, drone (or other automated device), truck, bus, boat, plane, helicopter, and the like, wherein each of the multiple vehicles 217 may be the same and/or different from each other.

In some embodiments, there may be one or more travelers (e.g., a driver and one or more passengers) associated with the vehicle 217. The driver may be associated with the vehicle 217 if the driver is an owner of the vehicle 217 and/or has access and/or permission to drive or operate the vehicle 217. Additionally or alternatively, a driver may be associated with the vehicle 217 if the driver is identified on an insurance policy that insures the vehicle 217. In some embodiments, one or more the passengers of the vehicle 217 may be uninsured or insurance policy holders.

A traveler (e.g., in the vehicle 217 or in another form of transportation) may interact with and operate an insurance status device 212. In some embodiments, travelers may each operate the insurance status device 212, which may be a specialized mobile device (e.g., mobile phone), a tablet, laptop, personal computer, and the like, configured to perform or carry out aspects associated with travel-based insurance ratings as described herein. For example, the insurance status device 212 may be the same (e.g., integrated with, include substantially the same components and provide substantially the same functionality, or the like) as the mobile device 220 or vehicle 217 depicted in FIG. 2. The insurance status device 212 may belong to a driver, passenger, or customer of an insurance provider who is enrolled in an insurance status determination service. In some cases, the insurance status device 212 may be at an insurance provider, and data may be transmitted between the traveler and the device 212. Although only one insurance status device 212 is illustrated in FIG. 2, there may be any number of insurance status devices 212, wherein each insurance status device 212 is associated with at least one traveler. The insurance status device 212 may further comprise an insurance determination module 213, a display 214, and sensors 215. In the case of an insurance status device 212 that is installed in or connected to a vehicle 217 (e.g., an on-board vehicle computing device), the individual is considered to operate that insurance status device 212 by performing the installation or connection of that device in or at the vehicle 217.

The insurance status device 212 may be configured to execute the insurance determination module 213 that presents a user interface (e.g., a graphical user interface for a website, application, software program, and the like) on the display 214. The display 214 may comprise a monitor, television, touchscreen, and/or the like. The user interface of the insurance determination module 213 may determine an insurance status for a traveler, confirm whether or not the traveler is driving or is a passenger, or on a different form of transportation, send and/or receive notifications of insurance status data (e.g., an expiring policy of the traveler, a lapsed policy, the presence of nearby underinsured motorists, etc.), and update account information or preferences for the insurance status determination service provided by the insurance status determination system 202. For example, the user interface may prompt the driver for identification verification information (e.g., a fingerprint, username and password, retinal scan, vocal password match, etc.). In some instances, a device, such as a fingerprint scanner in a steering wheel, may provide the identification verification information. In some instances, contextual data may be used for identification verification information. For example, the weight and position of a seat, radio settings, etc. may be used to verify an identity. In another example, driving behavioral characteristics (how a driver brakes, turns, accelerates, etc.) may be used for identification verification information.

The insurance determination module 213 may be a self-sufficient program or may be a module of another program, such as a program used to collect and/or determine the insurance status of a driver associated with a vehicle 217, and/or status updates of other travelers. The insurance determination module 213 may have access to traveling data (e.g., driving data and/or movement data) that is collected by the sensors 215 of the insurance status device 212. The insurance determination module 213 may be configured in a similar manner as the insurance status manager 101 or configured to perform similar functions as those performed by the insurance status manager 101. The sensors 215 may comprise various sensors and/or modules that detect driving behaviors, environmental information, and/or other related factors of a driver of a vehicle 217. For example, the sensors 215 may comprise one or more of a fingerprint reader, retina scanner, camera and/or facial recognition sensor, accelerometer, speedometer, GPS, gyroscope, and the like. The sensors 215 may also include one or more of fuel level sensors, tire pressure sensors, car engine sensors, oxygen sensors, temperature sensors, water sensors, coolant sensors, position sensors, oil pressure gauges, and the like. The sensors 215 may ultimately detect and collect real-time data associated with vehicle 217, including identification data corresponding to a traveler and/or including movement data representing any changes in position, velocity, and/or acceleration of the insurance status device 212, as well as driving data representing a driver's speeds, accelerations, braking, GPS coordinates, and the like. The insurance determination module 213 may have access to data that is collected by one or more of the sensors 215 of the insurance status device 212.

In some cases, the sensors 215 may include a microphone which may be used to detect a vocal signature of a traveler of a vehicle 217. The microphone of the rating device 212 (e.g., or a microphone installed on the mobile device 220) may detect vocal patterns of a traveler. For example, the traveler may state his or her name or a password after a prompt. The insurance determination module 213 may use this collected data from the one or more sensors 215, along with driving data, to identify a traveler.

In some embodiments, the insurance determination module 213 may be downloaded or otherwise installed onto the insurance status device 212 using known methods. Different devices may install different versions of the insurance determination module 213 depending on their platform. A traveler may launch the insurance determination module 213 by, for example, operating buttons or a touchscreen on the insurance status device 212. Additionally, or alternatively, the insurance status device 212 may be configured to execute a web browser (e.g., an application for accessing and navigating the Internet) to access a web page providing an interface for the insurance determination system 202. In some embodiments, the insurance status device 212 may also be configured to collect information such as traveling data (e.g., movement data and/or driving data). For example, the insurance determination module 213 or another program installed on the insurance status device 212 may instruct the insurance status device 212 to collect traveling data using the various sensors 215 (e.g., accelerometer, speedometer, GPS, gyroscope, magnetometer, car engine sensors, oxygen sensors, temperature sensors, water sensors, coolant sensors, position sensors, oil pressure gauges, and the like). Traveling data may include movement data representing any changes in position, velocity, and/or acceleration of a device (e.g., mobile device 220, insurance status device 212, etc.) associated with a traveler, as well as data regarding a driver's speed, acceleration, braking, steering, turn signals, and/or the like. In some instances, the traveling data may be transmitted to the insurance status determination system 202 or some other system. The traveling data may be used to modify a policy associated with the driver based on the risk associated with the traveling data.

In some arrangements, a traveler associated with the vehicle 217 and associated with the insurance status device 212 may employ the insurance determination module 213 to send, receive, and/or access insurance status information. For example, a traveler may review the status of an insurance policy for the vehicle 217, see that a payment due date is approaching, and renew the policy.

As illustrated in FIG. 2, vehicle 217 may include a driver identification system 218. The driver identification system 218 may authenticate the identity of a driver. For example, the driver identification system 218 may perform a facial recognition of a driver. In some instances, the driver identification system may implement or be communicatively coupled with an insurance status device 212. For example, the driver identification system 218 may implement one or more identification techniques discussed above (for example, a retinal scanner), and relay identification information to the insurance status device 212. In some instances, the vehicle 217 may comprise an insurance status device 212. The vehicle 217 may also comprise a display 222, which may prompt the user for identification information and/or present an interactive interface for the insurance status device 212. Information from the driver identification system 218 and/or display 222 may be processed by a vehicle control computer 227. This information may then be transmitted to an insurance status determination system 202 and/or an insurance status device 212.

In some instances one or more vehicles 217 may share insurance status information. For example, one vehicle 217 may engage in vehicle to vehicle (V2V) communication with another vehicle 217. The vehicles 217 may exchange insurance status information for their respective drivers. In some instances, a driver may be notified of the presence of underinsured motorists in the vicinity. For example, the display 222 may notify the driver that an indicated number of motorists within 100 yards of the vehicle are underinsured. Information may also be shared with an insurance status device 212. For example, one or more insurance status devices 212 along with one or more vehicles 217 may exchange insurance status information. In another example, the insurance status devices 212 may monitor the insurance status for travelers, and the display 222 may present information to the driver based on the monitored information. The V2V communication may also enable certain features of vehicles. For example, automated vehicle platooning (e.g., sharing communication between cars so that they may travel as a pack, sharing information about driving conditions) may only operate between vehicles that are verified to be insured.

FIG. 2 also illustrates a mobile device 220, which may be any mobile device associated with a traveler (e.g., a driver or passenger of vehicle 217, or an individual in another form of transportation). In particular, the mobile device 220 may belong to a traveler (e.g., driver or passenger of the vehicle 217 or an individual in another form of transportation). Mobile device 220 may be, for example, a smartphone or other mobile phone, personal digital assistant (PDA), tablet computer, and the like, and may include some or all of the elements described above with respect to the insurance status manager 101. As shown in this example, some mobile devices (e.g., mobile device 220) may be configured to establish communication sessions with vehicle-based devices and various internal components of vehicle 217 via wireless networks or wired connections (e.g., for docked devices), whereby such mobile devices 220 may have secure access to internal vehicle sensors and other vehicle-based systems. However, in other examples, the mobile device 220 might not connect to vehicle-based computing devices and internal components, but may operate independently by communicating with vehicle 217 via their standard communication interfaces or might not connect at all to vehicle 217. In some cases, the mobile device 220 may be configured similarly to the insurance status device 212 and may interface or communicate with the vehicle 217 and/or insurance status device 212 via a wired connection (e.g., USB, OBD II connector, and the like) or a wireless connection (e.g., Bluetooth).

FIG. 2 also illustrates example subsystems within the network environment 200. That is, the insurance status determination system 202 may comprise an insurance status subsystem 203 and a plurality of databases 206. The insurance status subsystem 203 may include one or more application servers, computing devices, and other equipment (e.g., conference bridge equipment) used by company (e.g., insurance company) personnel to implement and provide indications of insurance status information. For example, the insurance status subsystem 203 may include an insurance validation module 205 that is configured with programmed instructions and/or algorithms to confirm identification information for a traveler and/or provide an indication of an insurance status for the traveler. The insurance validation module 205 may retrieve and/or store data regarding the insurance status of a traveler using one or more records in a database (e.g., database 206) of the insurance status determination system 202, in which the one or more records may be associated with passenger, driver, or customer records stored in the database. For example, the one or more records may identify a unique identification number for a passenger, driver, or customer. In one example, a mobile device may be associated with the traveler through the use of a unique identification number (e.g., a phone number) for the traveler. In another example, the one or more records may include multiple fields for insurance ratings, including premium level, deductible level, covered amounts, covered damage types, and the like. The insurance validation module 205 may update database information based on changes received from an external communication (for example, a policy renewal notice received from an insurance status device 212).

The insurance status subsystem 203 may include functionality that may be distributed among a plurality of computing devices. For example, the insurance status subsystem 203 may comprise further subsystems, including client-side subsystems and server-side subsystems. The client-side subsystem may interface with the insurance status device 212, display 222, and/or mobile device 220, whereas the server-side subsystem may interface with application servers and computing devices that handle a variety of tasks related to identifying status information for a traveler. For example, the subsystem 203 may also include one or more servers, such as a status retrieval server 207. The status retrieval server 207 may be configured to retrieve insurance status information from other servers and/or service providers. For example, in response to a request for insurance status information from an insurance status device 212, the status retrieval server 207 may determine that a driver of the vehicle 217 is not associated with a service provider and query other servers associated with other service providers for insurance status information for the traveler. The status retrieval server 207 may receive insurance status information for the traveler from another service provider, store the insurance status information in a database 206, and forward the insurance status information to the insurance status device 212.

The subsystems, application servers, and computing devices of the insurance status subsystem 203 may access the plurality of databases 206. In some embodiments, the plurality of databases 206 may be incorporated into the insurance status subsystem 203 or may be separate components in the insurance status subsystem 203. As an example, the plurality of databases 206 (e.g., databases 206*a*-206*n*) may comprise an accounts and billing database, a driving behaviors database, an insurance rating database, and other databases. One or more of the databases 206*a*-206*n* may comprise information regarding insurance status information for travelers. For example, databases 206*a*-206*n* may store one or more records of insurance coverage, policy periods, prior accidents, collected traveling data for previous trips, analyzed driving behaviors, claims history, and the like. The data stored in the plurality of databases 206 may be collected and compiled by the insurance status device 212, the insurance status subsystem 203, or by servers and subsystems within the insurance status subsystem 203.

Figure 3:
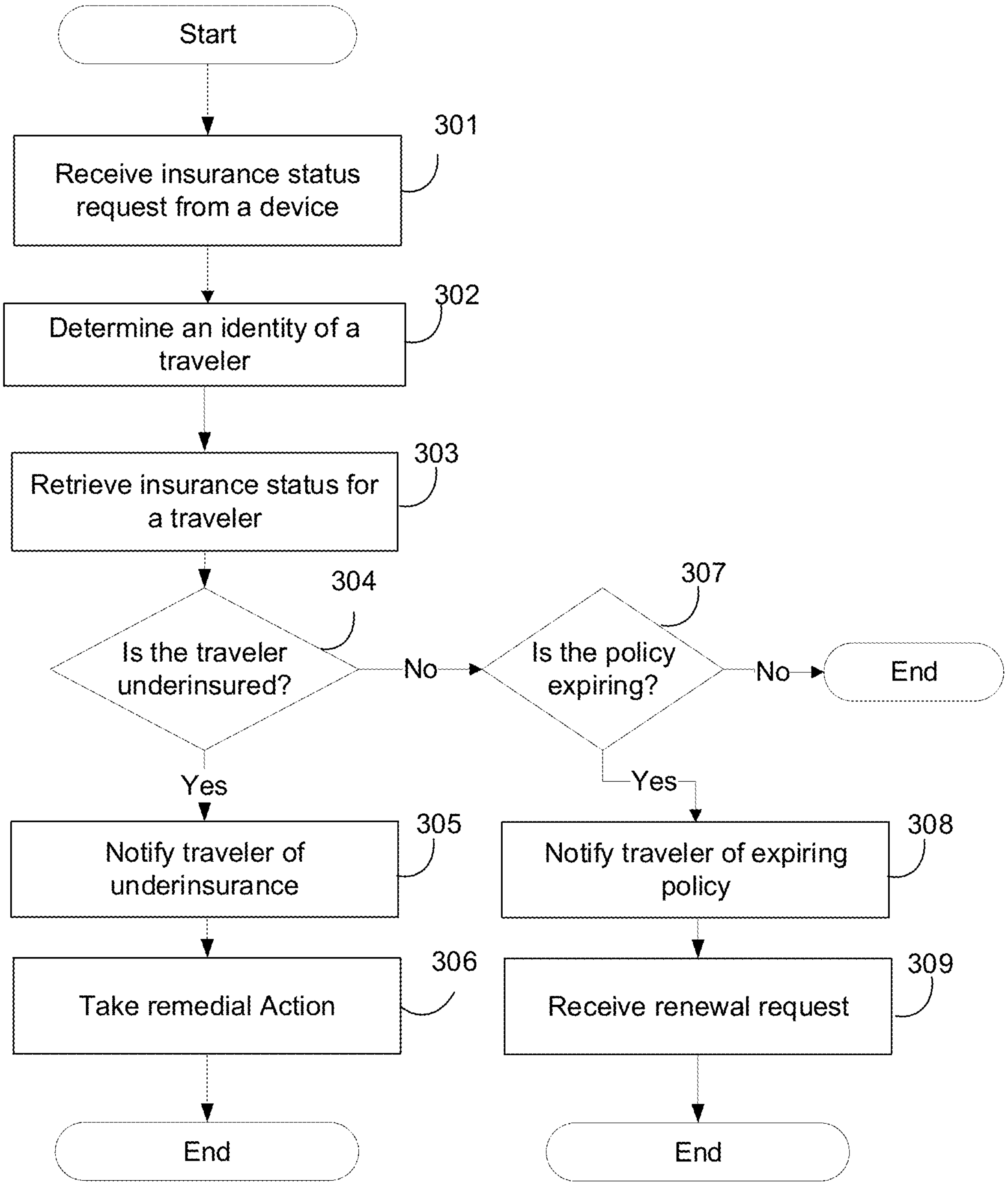
FIG. 3 depicts a flow diagram of example method steps for determining an insurance status for a traveler in accordance with one or more example embodiments.

FIG. 3 illustrates a flow diagram of an example method in accordance with aspects of the present disclosure. In particular, FIG. 3 illustrates example method steps for determining an insurance status for a traveler. The steps of FIG. 3 may be performed by subsystems, application servers, and computing devices of the insurance status determination system 202 (e.g., insurance status subsystem 203, insurance rating module 205, and/or status retrieval server 207). One or more of the steps of FIG. 3 may be performed by executing an insurance status program (e.g., an insurance status determination mobile and/or vehicular application) and/or by operating a particularly configured computing device of the insurance status determination system 202.

The method of FIG. 3 may begin with a step 301 of receiving an insurance status request from a device. For example, the insurance status determination system 202 may receive a request to determine an insurance status for a traveler from at least one of the mobile device 220, vehicle 217, or insurance status device 212. In some embodiments, the traveler may be a driver of vehicle 217, a passenger in vehicle 217, or a passenger in any mode of transportation (e.g., a bus, a train, airplane, spacecraft, etc.). The insurance status request may be in response to the traveler attempting to operate the vehicle. For example, an automobile may initiate an insurance status request in response to an ignition key being inserted into the vehicle. In some instances, the vehicle may prevent some action (e.g., shifting gear into drive) until the method of FIG. 3 is performed and/or an insurance status is verified. In other embodiments, the traveler may be moving by foot (e.g., walking, jogging, or running) or traveling on a bicycle.

At step 302, the system may determine the identity of a traveler. That is, the insurance status determination system 202 may determine who a traveler is so that an insurance status may be retrieved for the individual. For example, a traveler who attempts to start a vehicle 217 may undergo an identification scan in the form of a fingerprint sensor, retina scan, facial recognition, etc. In some instances, the traveler may be prompted to provide identification. For example, the display 222 and/or an audio cue may present a request for the traveler to provide identification. In some arrangements, the insurance status determination system 202 may determine the identification information for the traveler. In some other arrangements, the identification information may be analyzed by the vehicle 217 or insurance status device 212.

At step 303, the system may retrieve the insurance status for the traveler. A request for an insurance status may be made by a device such as a vehicle 217 or insurance status device 212. In some instances, the request may be made subsequent to identifying the traveler. In other instances, the request may be included with identification data sent to the insurance status determination system 202 as part of step 302. For example, a retina scan and a request for an insurance status may be sent in a single transmission.

The insurance status information may then be transmitted to the requesting device by the system. For example, a vehicle 217 may be informed that the traveler has a valid insurance policy compliant with state laws. In another example, an insurance status device 212 may be informed that an insurance policy associated with the traveler expired two months previously. In yet another example, a vehicle 217 may be informed that the traveler is not insured to drive the vehicle 217.

At step 304, the system may determine if the traveler is underinsured. That is, the insurance status determination system 202 may provide an indication of whether the traveler meets insurance guidelines corresponding to a vehicle 217 and/or a location of the traveler. For example, the insurance status determination system 202 may determine that a traveler in the United States is properly insured to drive an automobile. In another example, the traveler may not be insured to drive a commercial truck. In yet another example, the insurance policy of the traveler may have lapsed or been revoked.

At step 305, the system may notify the traveler of underinsurance. The system may warn the traveler and/or passengers with the traveler that the traveler is not properly insured. For example, a vehicle 217 may present an audio prompt and/or warning on the display 222. A warning may also be presented via a mobile device 220 (e.g., an audio/visual cue, notification, etc.) and/or an insurance status device 212 (e.g., an audio warning, warning on display 214, etc.).

At step 306, the system may take some remedial action. The insurance status determination system 202 and/or insurance status device 212 may transmit instructions to the vehicle 217 to impose restrictions and/or take some action if an underinsured driver is detected. For example, a vehicle 217 may face restricted operation if the traveler is underinsured. In some instances, the vehicle 217 may remain or become stuck in park. In another example, the vehicle 217 may not allow the traveler to accelerate beyond a certain speed. In another example, the vehicle 217 may only be allowed to travel for a limited distance. In another example, a warning of underinsurance may be presented to outside parties, such as passengers, nearby drivers (e.g., drivers of a vehicle within a predefined distance of the driver or vehicle) (such as a warning transmitted via V2V communication to nearby vehicles), and/or law enforcement. In another example, an autonomous vehicle may be limited to low-risk areas due to limitations of a policy (e.g., a policy may only allow for travel on low-risk roads, or a restriction to low-risk roads may be enforced when no valid policy is present). In some embodiments, the vehicle 217 may impose restrictions on itself (for example, the vehicle 217 may detect a driver known to be underinsured, and refuse to shift out of park until confirmation of proper insurance is received).

The driver may further be presented with a prompt to renew his or her insurance policy. For example, display 222 or display 214 may present the traveler with an option to renew his or her insurance policy if the policy has expired. The traveler may be presented with other options to correct defects in his or her insurance policy (for example, the traveler may be presented with an option to add motorcycle coverage).

At step 307, the system may determine if an insurance policy associated with the traveler will soon expire. The system may prompt a traveler to renew his or her insurance if the policy is within a certain threshold of expiring, or financial information has become invalid a credit card has expired). In some instances, the prompt may not be presented if the policy is expected to successfully automatically renew based on saved preferences (e.g., no action is required to renew the policy).

At step 308, the system may notify the traveler that his or her insurance policy needs to be renewed. For example, an audio cue may be given and/or a prompt may be displayed on display 214 or display 222. The traveler may then input information and/or provide instructions to renew the policy through mobile device 220, insurance status device 212, vehicle 217, a web page, etc.

At step 309, the system may receive a renewal of the insurance policy. For example, the system may receive instructions to renew the insurance policy from input provided by the traveler on a display 222 in an infotainment system of an automobile.

Figure 4:
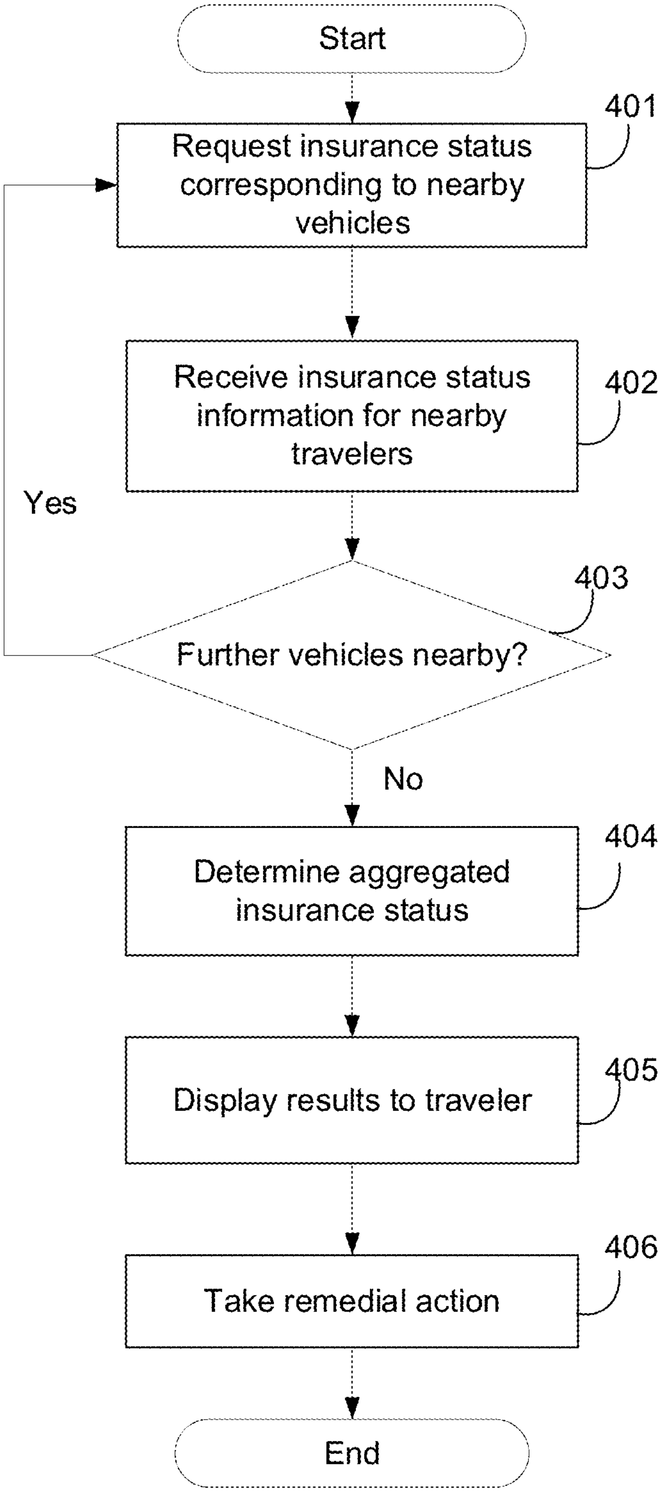
FIG. 4 depicts a flow diagram of example method steps for determining the insurance status of nearby vehicles in accordance with one or more example embodiments.

FIG. 4 illustrates a flow diagram of an example method in accordance with aspects of the present disclosure. In particular, FIG. 4 illustrates example method steps for determining the insurance status of nearby vehicles. The steps of FIG. 4 may be performed by subsystems, application servers, and/or computing devices of the insurance status determination system 202 (e.g., insurance status subsystem 203, insurance rating module 205, and/or status retrieval server 207). One or more of the steps of FIG. 4 may be performed by executing an insurance status program (e.g., an insurance status determination mobile and/or vehicular application) and/or by operating a particularly configured computing device of the insurance status determination system 202.

The method of FIG. 4 may begin with a step 401 of requesting an insurance status for drivers of nearby vehicles. For example, a vehicle 217, mobile device 220, and/or insurance status device 212 may broadcast a request to nearby devices (such as by using wireless internet, a cell connection, Bluetooth, V2V communication, etc.). Nearby devices (such as other vehicles 217, mobile devices 220, and/or insurance status devices 212) may determine an insurance status for a driver associated with each device (such as using a method consisting with the method discussed above regarding FIG. 3).

At step 402, the system may receive insurance status information for nearby travelers associated with nearby vehicles and/or nearby devices. A nearby traveler, vehicle, or device may be a traveler, vehicle, or device within a certain distance and/or radius of a vehicle and/or driver. For example, a nearby traveler may be any vehicle within 100 meters of a vehicle 217 associated with a driver. In some instances, nearby devices may individually retrieve insurance status information (such as through the insurance status determination system 202 or another system using a compatible format). In other instances, nearby devices may supply identification information to the system, which may then retrieve insurance status information from the insurance status determination system 202 consistent with the methods described herein.

At step 403, the system may determine if further information is incoming. The system may wait a certain period of time to collect information. The system may also receive an indication from other devices that further information will be forthcoming, and await such information (which may be subject to a timeout). In some instances, the system may detect nearby vehicles (such as by V2V communication and/or sensors on the vehicle 217), and await a threshold period of time for nearby vehicles to respond. For example, a vehicle 217 may detect five nearby vehicles. The vehicle 217 may request insurance status information from the vehicles and receive information from four vehicles. After five seconds, if there is no response from the fifth vehicle, the vehicle 217 may again request insurance status information. If no information is received from the fifth vehicle after an additional five seconds, the system may proceed to step 404.

At step 404, the system may determine an aggregate insurance status for nearby vehicles. For example, the system may determine that there are two uninsured motorists within 100 yards of the vehicle 217. The system may rely on the insurance status determination system 202 and/or insurance status device 212 to provide additional calculation. For example, an insurance status determination system 202 may receive insurance status reports run by multiple instances of the method depicted in FIG. 3 and/or FIG. 4 from multiple vehicles. The insurance status determination system 202 may use the reports to determine the likelihood of a collision with an underinsured vehicle in a geographic area. In some instances, contextual information may be used as a substitute in determining an aggregated insurance status. For example, a statistical model may make use of various factors (e.g., location, road class, geographic area, time of day, available insurance status information for other vehicles, etc.) to determine predicted insurance status information for vehicles with an unknown insurance status.

At step 405, the system may transmit the aggregated insurance status to the passenger. For example, the insurance status determination system 202 may transmit a notification regarding the aggregated insurance status to a display 214, a display 222, and/or a mobile device 220 associated with the traveler and/or the vehicle 217.

At step 406, the system may take some remedial action in response to the aggregated insurance status. For example, the system may prompt the user to purchase a limited-time policy to cover a collision with an underinsured motorist in response to a large number of underinsured motorists in the vicinity. In another example, the system may limit the speed of the vehicle 217 to reduce the chance of a collision. In another example, the system may direct the GPS or autonomous navigation system of the vehicle 217 to direct the vehicle 217 to a route with lower risk.

Figure 5B:
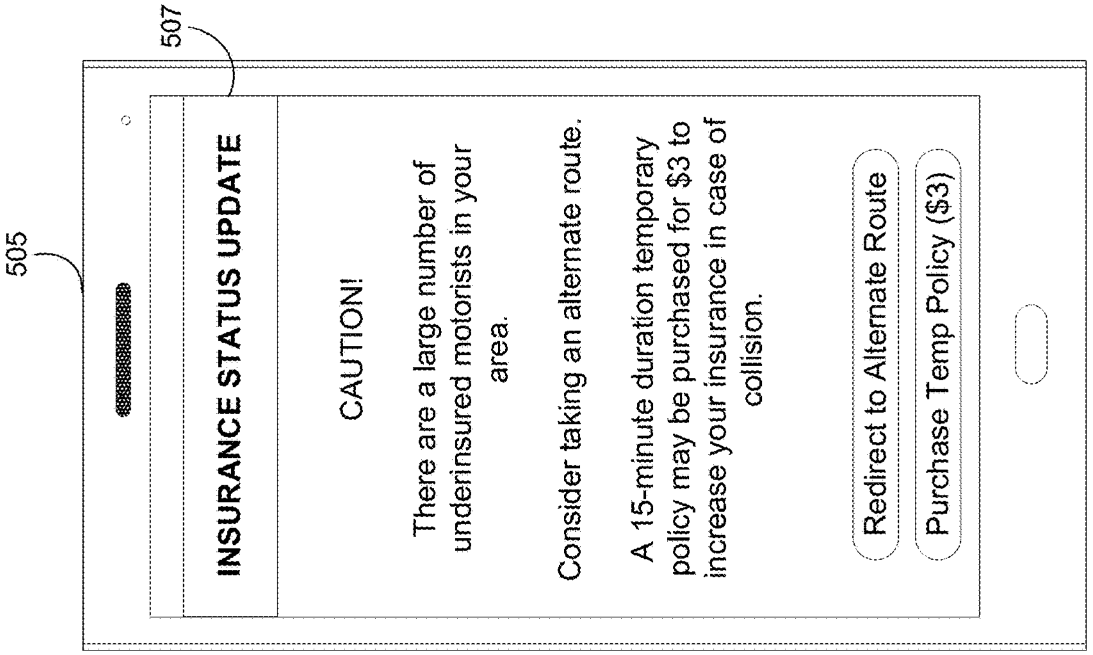
FIG. 5A and FIG. 5B depict illustrative diagrams of example user interfaces of an insurance status notification application in accordance with one or more example embodiments.
Figure 5A:
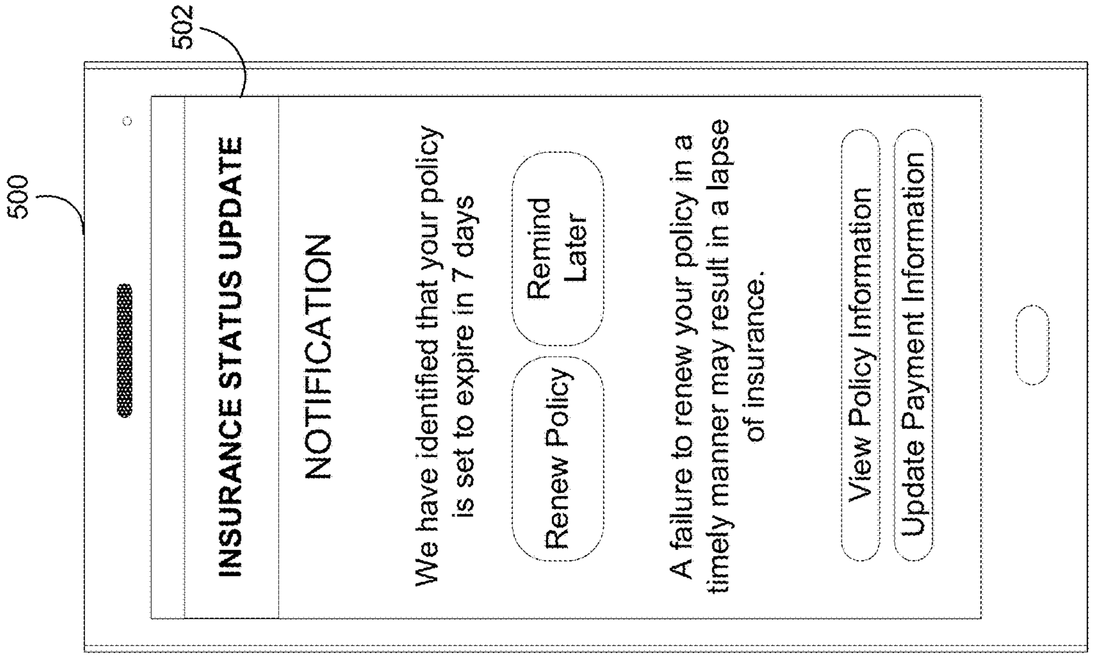

The user interface in FIG. 5A depicts an example of a notification 502 informing a traveler that his or her insurance policy is expired. In response to an insurance status determination determining that a traveler has a policy set to expire (such as using the method described above in FIG. 3), a vehicle 217, insurance status device 212, or mobile device 220 may present a screen 500 with the notification 502 informing the traveler of the imminent expiration. The traveler may be presented with options to renew the policy, view/update policy information, view/update payment information, asked to be reminded later, and/or any other such option.

The user interface in FIG. 5B depicts an example of a notification 507 informing a traveler of an aggregated insurance status. In response to an insurance status determination determining that a traveler is in the vicinity of other underinsured travelers (such as using the method described above in FIG. 4), a vehicle 217, insurance status device 212, and/or mobile device 220 may present a screen 505 with the notification 507 informing the traveler of the presence of underinsured motorists in the area. The traveler may be presented with options to take a route to avoid the underinsured motorists, purchase a temporary policy to cover a collision with an underinsured motorist, and/or any other such option.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:

a processor and a memory, the system configured to:

receive insurance status information corresponding to a plurality of travelers each associated with one of a plurality of vehicles;

identify one or more travelers of the plurality of travelers that are located proximal a first traveler of the plurality of travelers, the first traveler is associated with a first vehicle of the plurality of vehicles;

determine, based on aggregating an insurance status of the one or more travelers, that the one or more travelers are underinsured;

impose at least one driving limitation based on the insurance status information for the first traveler, the at least one driving limitation controlling operation of the first vehicle;

prompt the first traveler to select at least one remedial action based on the determination that the one or more travelers are underinsured; and remove the at least one driving limitation based on the selection of the remedial action.

2. The system of claim 1, wherein the plurality of travelers are each associated with one of a plurality of computing devices.

3. The system of claim 1, wherein the at least one remedial action includes at least one of purchasing an insurance policy, limiting a speed of the first vehicle, or directing the vehicle to a route associated with a risk below a maximum risk threshold.

4. The system of claim 1, wherein the at least one driving limitation includes at least one of an alternate route, a restriction against changing a gear associated with the first vehicle out of park, a maximum allowable travel distance, or a maximum speed.

5. The system of claim 1, wherein the system is further configured to:
- generate a user interface causing presentation of a notification associated with the insurance status information.

6. The system of claim 1, wherein the system is further configured to:
- generate a user interface causing presentation of a notification indicating a presence of the one or more travelers that are underinsured.

7. The system of claim 1, wherein one or more of the plurality of vehicles is located proximal the first vehicle.

8. A method comprising:
- receiving insurance status information corresponding to a plurality of travelers each associated with one of a plurality of vehicles;
- identifying one or more travelers of the plurality of travelers that are located proximal a first traveler of the plurality of travelers, the first traveler is associated with a first vehicle of the plurality of vehicles;
- determining, based on aggregating an insurance status of the one or more travelers, that the one or more travelers are underinsured;
- imposing at least one driving limitation based on the insurance status information for the first traveler, the at least one driving limitation controlling operation of the first vehicle;
- prompting the first traveler to select at least one remedial action based on the determining that the one or more travelers are underinsured; and
- removing the at least one driving limitation based on the selection of the remedial action.

9. The method of claim 8, wherein the plurality of travelers are each associated with one of a plurality of computing devices.

10. The method of claim 8, wherein the at least one remedial action includes at least one of purchasing an insurance policy, limiting a speed of the first vehicle, or directing the vehicle to a route associated with a risk below a maximum risk threshold.

11. The method of claim 8, wherein the at least one driving limitation includes at least one of an alternate route, a restriction against changing a gear associated with the first vehicle out of park, a maximum allowable travel distance, or a maximum speed.

12. The method of claim 8, further comprising:
- generating a user interface causing presentation of a notification associated with the insurance status information.

13. The method of claim 8, further comprising:
- generating a user interface causing presentation of a notification indicating a presence of the one or more travelers that are underinsured.

14. The method of claim 8, wherein one or more of the plurality of vehicles is located proximal the first vehicle.

15. One or more non-transitory computer-readable media storing instructions that, when executed by at least one processor, cause the at least one processor to:
- receive insurance status information corresponding to a plurality of travelers each associated with one of a plurality of vehicles;
- identify one or more travelers of the plurality of travelers that are located proximal a first traveler of the plurality of travelers, the first traveler is associated with a first vehicle of the plurality of vehicles;
- determine, based on aggregating an insurance status of the one or more travelers, that the one or more travelers are underinsured;
- impose at least one driving limitation based on the insurance status information for the first traveler, the at least one driving limitation controlling operation of the first vehicle;
- prompt the first traveler to select at least one remedial action based on the determination that the one or more travelers are underinsured; and
- remove the at least one driving limitation based on the selection of the remedial action.

16. The one or more non-transitory computer-readable media of claim 15, wherein the plurality of travelers are each associated with one of a plurality of computing devices.

17. The one or more non-transitory computer-readable media of claim 15, wherein the at least one remedial action includes at least one of purchasing an insurance policy, limiting a speed of the first vehicle, or directing the vehicle to a route associated with a risk below a maximum risk threshold.

18. The one or more non-transitory computer-readable media of claim 15, wherein the at least one driving limitation includes at least one of an alternate route, a restriction against changing a gear associated with the first vehicle out of park, a maximum allowable travel distance, or a maximum speed.

19. The one or more non-transitory computer-readable media of claim 15, further comprising:
- generating a user interface causing presentation of a notification associated with the insurance status information.

20. The one or more non-transitory computer-readable media of claim 15, wherein one or more of the plurality of vehicles is proximal the first vehicle.

* * * * *